Aug. 5, 1952
O. C. HAGAN
2,606,294
METHOD OF TESTING WOOD
Filed Feb. 14, 1949
4 Sheets-Sheet 1
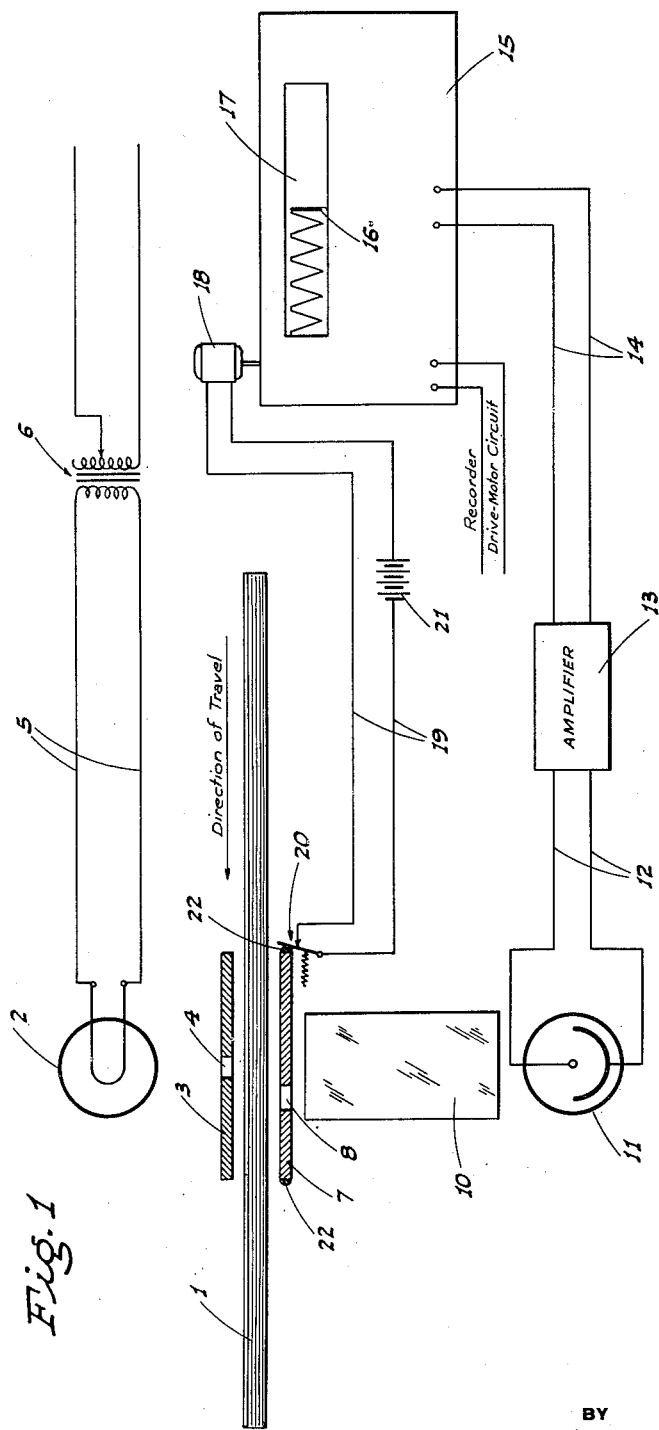
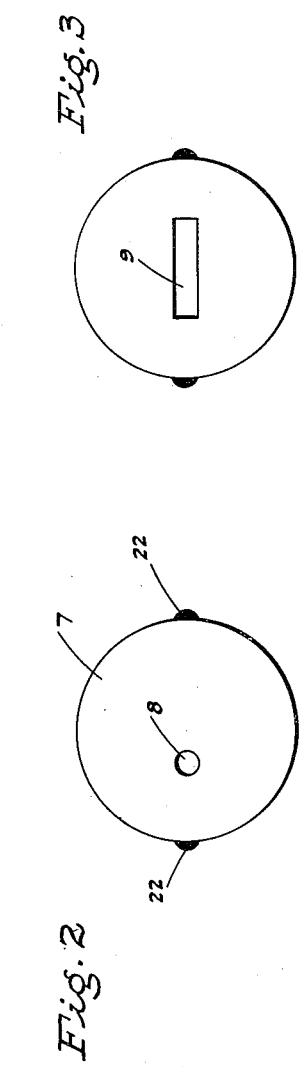
INVENTOR
Owen C. Hagan
BY
ATTORNEYS Aug. 5, 1952 — O. C. HAGAN — 2,606,294
METHOD OF TESTING WOOD
Filed Feb. 14, 1949 — 4 Sheets-Sheet 4

INVENTOR
Owen C. Hagan
BY
ATTORNEYS

Patented Aug. 5, 1952

2,606,294

UNITED STATES PATENT OFFICE 2,606,294

METHOD OF TESTING WOOD

Owen C. Hagan, Stockton, Calif., assignor to California Cedar Products Company, Stockton, Calif., a corporation of California Application February 14, 1949, Serial No. 76,237

1 Claim. (Cl. 250—83.3)

This invention is directed to the art of testing or inspection of wood, or other fibrous material, in sheets, strips, or slats in advance of manufacture thereof into a product.

In many industries, such as the wooden aircraft parts industry, plywood industry, and pencil slat industry it is desirable to test wooden sheets, strips, or slats before they are used for production; this testing usually being done visually, with the eye searching for crooked, short or spiral grain, knots, decay, or other defects. This type of testing may be termed "non-destructive testing" as distinguished from destructive testing, such as hardness or rupture tests, which damage or destroy the wood. However, the visual "non-destructive" testing reflects only defects which are readily apparent on the surface, and does not give any accurate indication of internal defects, or defects which may appear at a point difficult to view, such as an edge, or unseen part, as for example the under side, or an intermediate layer, of the piece being tested.

It is therefore an object of this invention to provide a novel method for testing wood pieces for structural abnormalities, both external and internal, and regardless of whether capable of visual ascertainment; such method contemplating the projection of a controlled pattern, intense beam of light through the piece of wood being tested, from one side thereof, and determining structural abnormalities thereof by the resultant variation from a predetermined normal of the emergent beam pattern on the opposite side of said piece.

An additional object of the invention is to provide a method, for the purpose described, which is especially adaptable for use to grade wood pieces, such as pencil slats.

It is also an object of the invention to provide a method which, while designed primarily for use to test wood, is quite adaptable to testing other material having a fibrous nature, and wherein the direction of the fibers is important with respect to the intended use of the material.

A further object of the invention is to provide a practical and reliable method of testing wood, and one which will be exceedingly effective for the purpose.

These objects are accomplished by means of such structure and relative arrangement of parts as will fully appear by a perusal of the following specification and claim.

In the drawings:

Fig. 1 is a diagrammatic illustration of the apparatus preferably used in carrying out my improved method.

Fig. 2 is a plan view of the scanning disc, detached.

Fig. 3 is a plan view of a modified scanning disc, detached.

Figure 4:
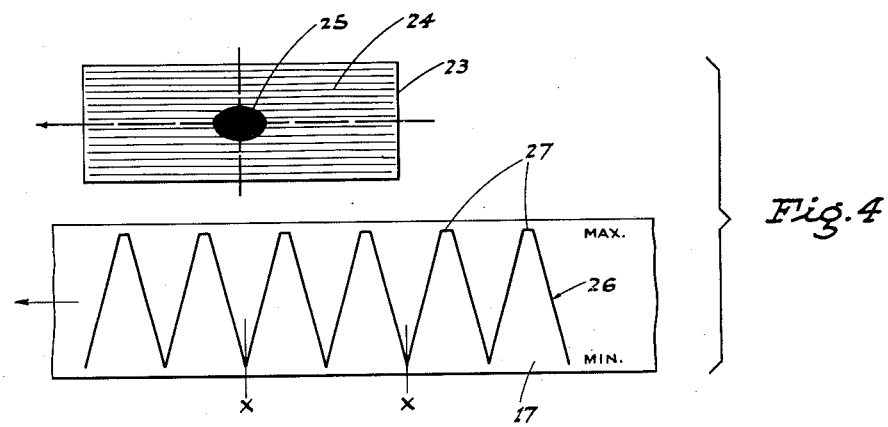
Fig. 4 is a diagrammatic bottom plan view of a normal slat with fibers parallel both to the side edges and flat surfaces of the slat; the corresponding emergent beam pattern being shown on the slat for the purpose of illustration, and the figure including a fragmentary diagram of the corresponding graph produced by the recorder.

Figs. 5-11, inclusive, are similar views but illustrate slats having different fiber or defect characteristics, and likewise show the corresponding emergent beam pattern and graph.

In Figs. 7-11, inclusive, the slat is shown additionally and diagrammatically in longitudinal edge elevation.

Referring now more particularly to the characters of reference on the drawings, the apparatus, for practicing the method, is indicated diagrammatically in Fig. 1 wherein the wood piece to be tested is illustrated in the form, for example, of a pencil slat 1 which is disposed with the flat thereof horizontal. By any suitable means (not shown) such slat 1 is supported and moved longitudinally in the direction indicated by the arrow.

An incandescent lamp 2 is mounted above the slat 1 and an intense beam of light is projected onto, and through, said slat by an aperture plate 3 interposed between said lamp and the slat; such plate including an aperture 4, preferably circular, formed therein. The lamp 2 is energized by means of a circuit 5 having a variable regulator 6 interposed therein for selective control of the intensity of lamp 2; the latter emitting a broad band of frequencies whose center is approximately 9000 Angstrom units, and thus in the invisible region.

The position of lamp 2 and aperture plate 3 are such that the beam of intense light is projected through the slat 1 at a right angle thereto. A rotary scanning disc 7 is disposed below the slat under the plate 3, said disc being supported and rotated in any convenient manner (not shown); the speed of rotation being relatively slow and selectively controlled. The scanning disc 7 is mounted concentric to the aperture 4 in aperture plate 3, and as shown in Fig. 2 such scanning disc is formed with a circular opening 8 offset from the axis of said disc.

In another form, see Fig. 3, the disc is provided with an elongated rectangular slot 9 which extends diametrally of said disc and symmetrical to its axis.

A vertical cylinder 10 of "Lucite" is mounted directly below the scanning disc 7; such cylinder being of greater diameter than that of the annular path of the opening 8. The purpose of the "Lucite" cylinder 10 is to transmit the light, which passes through the scanning disc 7, to a photo-electric cell 11 mounted in light receiving or responsive relation directly below the lower end of said cylinder 10; said photo-electric cell 11 having an output circuit 12 which is direct-connected to a current amplifier 13.

In turn the amplifier 13 is connected by its output circuit 14 to the pen actuating input terminals of an electro-mechanical or graphic recorder 15 which includes a vertically reciprocating pen 16 which scribes on a horizontally traveling graph paper 17. This recorder 15 is of generally conventional type which includes a motor to drive the graph paper 17 at a constant, selectively controlled speed. This speed should be substantially the speed of slat 1, or at least bear known relation thereto.

The recorder is fitted, additionally, with a motor 18, or other electrical actuating device, which acts, when momentarily energized, to speed up, or jerk the graph paper 17 ahead, for an instant whereby the pen 16 then makes a jog in the line being scribed on the graph paper 17, for the purpose hereinafter explained. The motor 18 is energized by a circuit 19 which includes a normally open switch 20 and a source of electric current 21.

The switch 20 is mounted closely adjacent the periphery of the scanning disc 7; the latter, in both embodiments, having a pair of nubs 22 projecting from the periphery in position to momentarily engage and close said switch 20 as said disc rotates. The nubs 22 are 180° apart and are in alinement with opening 8, or slot 9, diametrally of the disc 7. With this arrangement, one nub or the other closes switch 20 and energizes motor 18 each time that said opening 8 alines with the disc axis relative to the direction of travel of the slat, which is twice for each revolution of said disc. Similarly, when the slotted form of disc is used, the switch is closed each time the slot 9 parallels said direction of travel; the latter being the direction of the fibers of a normal slat.

When the apparatus is in use with a scanning disc 7 having either an offset opening 8, or a slot 9, the method of testing is accomplished generally as follows:

As previously indicated, the slat 1 and graph paper 17 travel at substantially the same speed, and in this instance in the same direction.

The high intensity beam of light from the lamp 2 is projected, by the aperture plate 3, downwardly at a right angle onto the top of the slat 1 in a circular pattern; the slat moving constantly so that said beam pattern is relatively transitory along said slat.

The disc 7, rotating beneath the slat 1, at a speed correlated to the speed of said slat 1 and graph paper 17, constantly scans the pattern of the emergent beam of light; said emergent beam, which is of fluctuating pattern and intensity according to fiber direction or other structural characteristics of the slat, passing successively by the part scanned through opening 8, or slot 9, downwardly onto the photo-electric cell 11 which reacts and sends a corresponding fluctuating current to the amplifier 13. This fluctuating current, as amplified, feeds to the recorder 15, causing the pen 16 to reciprocate in response to said current, thus scribing a graph on the traveling graph paper 18. Also, with each closing of switch 20, the graph paper is jerked ahead a short distance so that the pen 16 then marks a jog in the graph being scribed. By proper interpretation of the graph, together with the relative positions of the jogs thereon, the grade of the slat 1 is ascertained.

When the slat 1, or other fibrous piece being tested, is of normal grade, the fibers are straight; i. e. run lengthwise of the slat generally parallel to its edges and flat surfaces. This condition is reflected in Fig. 4, wherein the slat is indicated at 23, the normal longitudinal fibers at 24, and the pattern of the emergent beam at 25; such pattern being oval with its major axis generally parallel to said fibers. This may be said to be the predetermined normal pattern of the emergent beam. This distortion from the circular pattern of the beam before passage through the slat is due to the fact that in a material of a fibrous nature composed of tubes or fibers, the axes of which lie essentially parallel, the light is refracted in the direction of the axis of said fibers.

The graph scribed by the recorder 15, when a normal slat 1 is being tested, is illustrated at 26 in Fig. 4. The smooth and even deflections of the graph, accompanied by the pen jogs 27 at the maximum point of said deflections is indicative of the normal fiber condition of the slat. This results by reason of the scanning of the symmetrical oval pattern of the emergent beam, and the closing of switch 20 at the moment that the scanning opening of disc 7 is at a dead center position with respect to the major longitudinal axis of said pattern. A graph, as in Fig. 4, therefore indicates to the operator that the slat being tested is of normal grade. Graphs illustrative of slats tested with structural abnormalities are shown in Figs. 5-11, hereinafter described.

Figure 5:
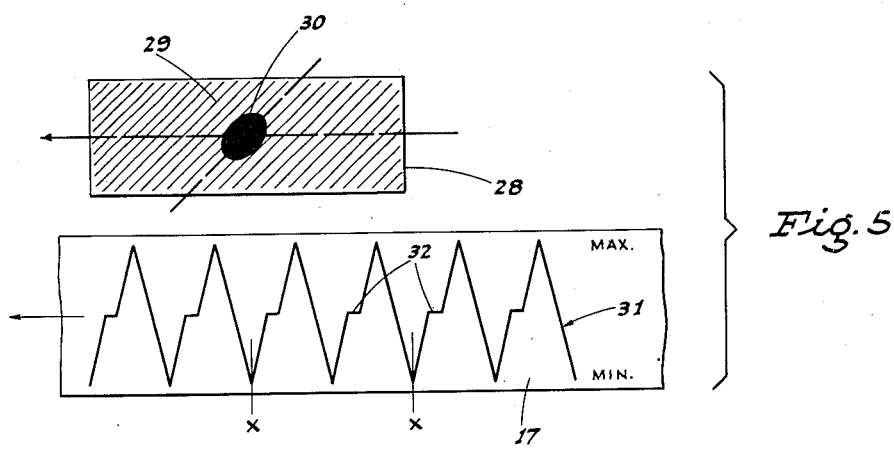

In Fig. 5 the slat 28 has fibers 29 which extend diagonally with respect to the longitudinal edges of the slat, as shown, and in this case the pattern 30 of the emergent beam remains oval, but is disposed with its major longitudinal axis parallel to said fibers. It has been found that the major longitudinal axis of the pattern of the emergent beam always remains generally parallel to the fibers of the slat, and this is one premise upon which the method is predicated.

When the fibers 29 are diagonal, as in Fig. 5, and the major longitudinal axis of the oval pattern 30 of the emergent beam is correspondingly diagonal, the resulting graph 31 has even deflections as before, but here the pen jogs 32 appear intermediate the ends of each rising deflection of said graph.

Figure 6:
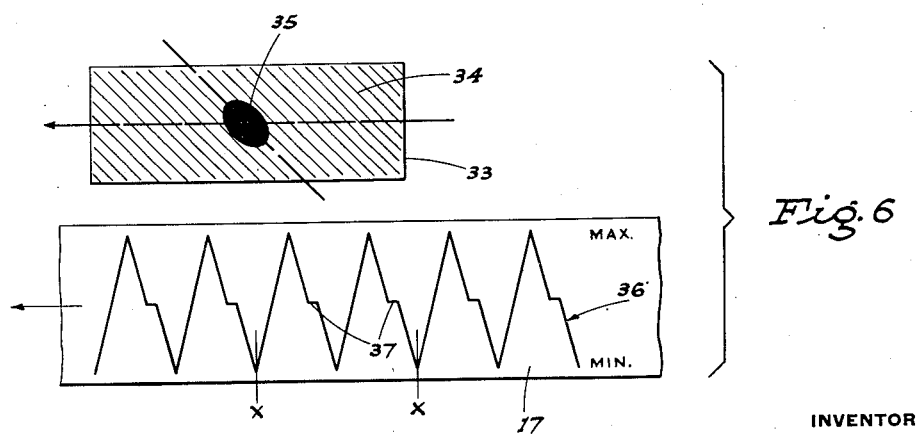

Fig. 6 illustrates a slat 33 with fibers 34 which are diagonal in a direction opposite to those of Fig. 5. The result is that the major longitudinal axis of the oval pattern 35 of the emergent beam is reversed, relative to Fig. 5, with respect to the line of travel of the slat, and the graph 36 has the pen jogs 37 intermediate the ends of each falling deflection of said graph.

It has been assumed that in the slats shown in Figs. 4, 5, and 6, the fibers remained parallel to the flat surfaces, and for this type of testing; i. e. testing solely for fiber direction with respect to the longitudinal edges of the slat, the scanning disc 7 is employed with the slot 9 as in Fig. 3. However, for determining fiber direction with respect to both the longitudinal edges of the slats and the flat surfaces thereof the scanning disc 7 is employed with the offset circular opening 8 as in Fig. 2. This offset circular opening 8 in the scanning disc is employed for testing for the characteristics shown in Figs. 7–11, inclusive, hereinafter described.

Figure 7:
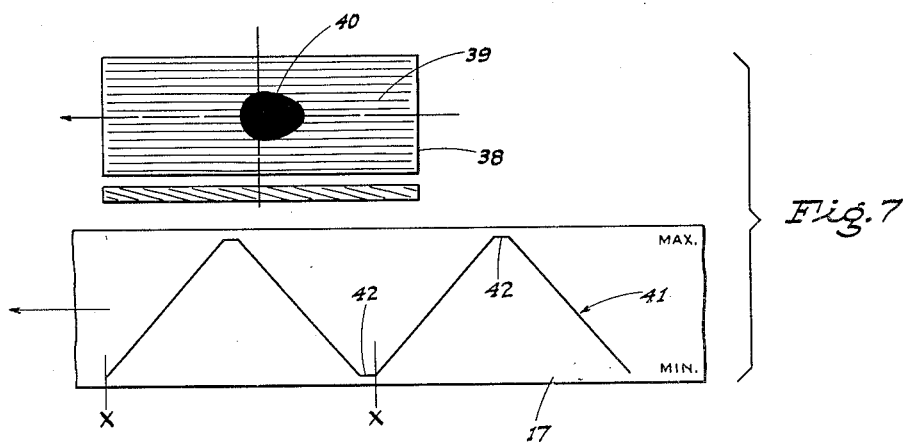

Fig. 7 illustrates the slat with fibers 39 which are parallel to the longitudinal edges of the slat, but sharply or acutely diagonal to the flat surfaces thereof. Under these conditions the pattern 40 of the emergent beam is egg-shaped, with its major longitudinal axis parallel to the direction of travel. The resultant graph 41 has even deflections, as shown, with the pen jogs 42 at the ends of both the rising and falling deflections. It is to be noted in this case that the total number of deflections, per revolution of the scanning disc and with the offset opening 8, is half the number that appeared when the rectangular scanning opening 9 was used as in Figs. 4–6, inclusive.

In Figs. 4–11, the graph region between lines x—x shows the number of deflections for one revolution of scanning disc 7.

Figure 8:
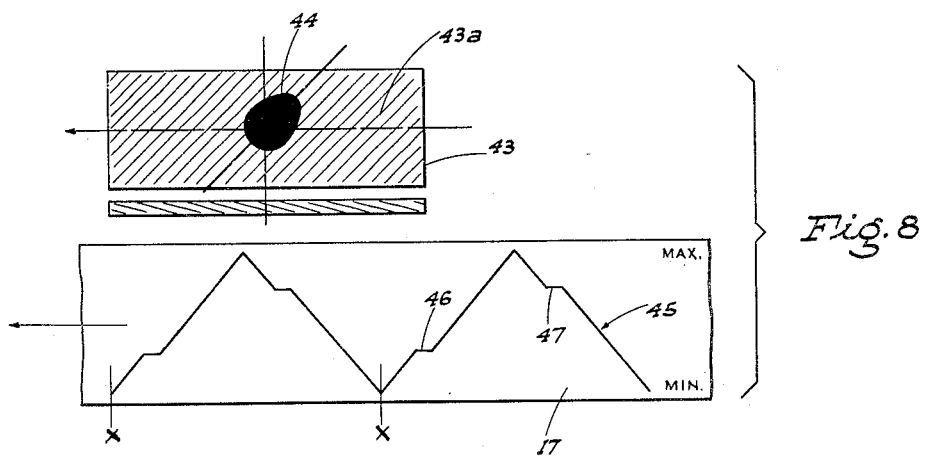

In Fig. 8 the condition of the slat is similar to Fig. 7, except that the slat 43 has fibers 43a which are diagonal to the longitudinal edges thereof. This throws the major longitudinal axis of the pattern 44 of the emergent beam likewise to a corresponding diagonal. With the egg-shaped pattern 44 so disposed, the graph 45 appears with even deflections, but with pen jogs 46 and 47 in both the rising and falling deflections intermediate the ends thereof; said jogs 46 being relatively low in the rising deflections and the jogs 47 relatively high in the falling deflections.

Figure 9:
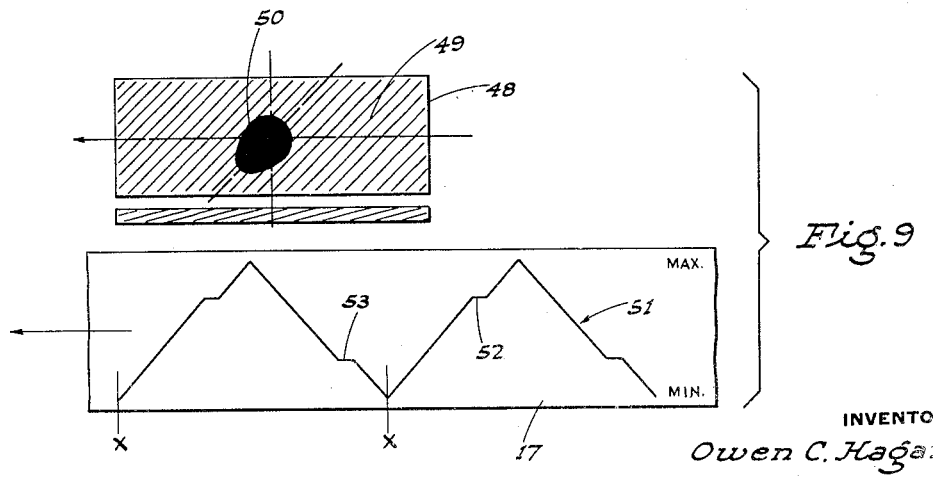

In Fig. 9 the slat 48 is the same as in Fig. 8, except that the fibers 49 are acutely diagonal to the flat surfaces of said slat in a direction opposite to that illustrated in Fig. 8. The result is a reversal of the position of the egg-shaped pattern 50; the graph 51 appearing—as a result—with jogs 52 relatively high in the rising deflections and jogs 53 relatively low in the falling deflections.

Figure 10:
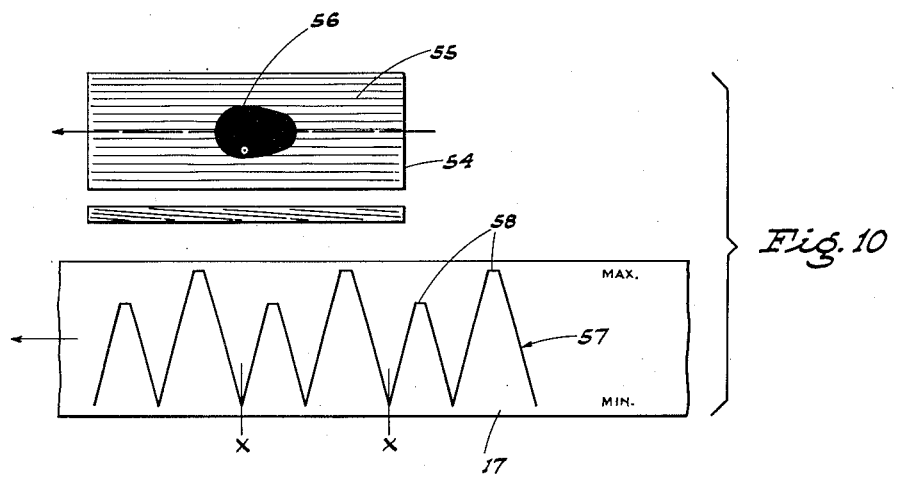

Fig. 10 illustrates a slat 54 wherein the fibers 55 are parallel to the longitudinal edges of the slat, and only slightly diagonal to the flat surfaces thereof. This type of slat produces a pattern 56 which is shaped and disposed so that when scanned by the scanning disc it results in a graph 57 wherein adjacent pairs of deflections have alternate high and low peaks, as shown, with a pen jog 58 at each such peak. Note also that there are two pairs of deflections for each revolution of the scanning disc.

Figure 11:
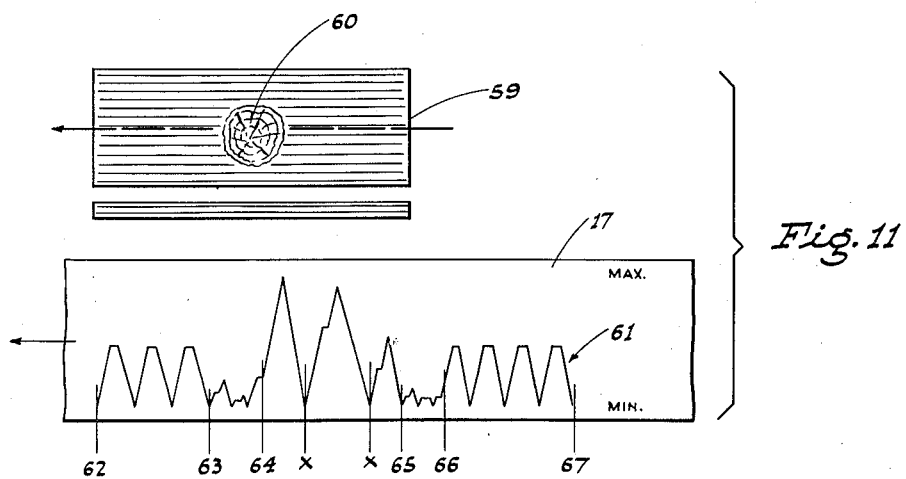

Fig. 11 is illustrative of a slat 59 having a defect therein, such as a knot 60. While here shown as a knot, the defect may be bark, burl, burnt wood, peck, decay, pith, mistletoe, mechanical damage, fungus, worm hole, or a defect caused by extremely abnormal grain. When such a defect travels into the beam being projected through the slat, and such defect is then scanned from below, the resulting graph 61 becomes quite abnormal in part. The deflections at the left hand end portion of the graph between 62 and 63 indicate normal wood structure; the pen deflections being even and symmetrical, and pen jogs 62 appearing at the peaks of said deflections. The portion of the graph 61 between 63 and 64 indicates the outermost portion of a knot; from 64 to 65 the center portion of the knot; from 65 to 66 the outer portion of the knot; and from 66 to 67 return to normal wood structure. The lamp regulator 6 may be set in such a manner as to cause the normal fiber deflections on the graph to occupy only half the width of said graph; thus permitting areas of less optical density and areas of greater optical density to be recorded.

From the foregoing it will be recognized that, in the graphs of Figs. 4–11, inclusive, the number and disposition of the deflections per revolution of the scanning disc, the length and symmetry of said deflections, and the relative positions and number of the pen jog marks, are a reflection of the structural characteristics of the slat or other fibrous material being tested.

By interpretation of the resultant graphs, which interpretation is predicated on initial experimentation, said graphs provide an accurate and effective test record not only of fiber direction, but also of other structural characteristics, such as defects, etc.; this being accomplished whether or not such fiber direction, defects, etc. are capable of visual detection from exteriorly of the slat.

As the method and apparatus produces an electro-response to abnormal structural characteristics of the pieces of material being tested, it is well within the realm of practical application to employ such electro-response to cause responsive actuation of an automatic mechanical sorting device for said pieces; this in addition to, or in substitution for, the recorder.

From the foregoing description it will be readily seen that there has been produced such a method as substantially fulfills the objects of the invention, as set forth herein.

While this specification sets forth in detail the present and prefered method, still in practice such deviations from such detail may be resorted to as do not form a departure from the spirit of the invention, as defined by the appended claim.

Having thus described the invention, the following is claimed as new and useful, and upon which Letters Patent are desired:

The method of determining the direction in which the fibers extend in a slab of fibrous wood; said method comprising establishing a beam of light of a radiation frequency of substantially 9,000 Angstrom units so as to penetrate the slab, moving the slab in a straight path past the beam of light in intersecting relation thereto, restricting the passage of the emergent beam to a constantly changing restricted area moving in a circular path concentric with but radially offset from the longitudinal axis of the initial beam of light, and then recording the variations in the diffused light pattern of the emergent beam passing through said restricted area.

OWEN C. HAGAN.

REFERENCES CITED

The following references are of record in the file of this patent:

UNITED STATES PATENTS

| Number | Name | Date |
| --- | --- | --- |
| 1,915,204 | Scheibli et al. | June 20, 1933 |
| 1,965,819 | Allen | July 10, 1934 |
| 2,037,044 | Reinartz et al. | Apr. 14, 1936 |
| 2,348,401 | Manzanera | May 9, 1944 |
| 2,393,631 | Harrison et al. | Jan. 29, 1946 |